(12) United States Patent
Samra (10) Patent No.: US 6,828,984 B2
(45) Date of Patent: Dec. 7, 2004

(54) SYSTEM AND METHOD FOR OPTIMIZING THE PROCESSING OF IMAGES

(75) Inventor: Sukendeep Samra, Venice, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 631 days.

(21) Appl. No.: 09/839,754

(22) Filed: Apr. 19, 2001

(65) Prior Publication Data

US 2003/0085932 A1 May 8, 2003

(51) Int. Cl.$^7$ ................................................ G09G 5/00
(52) U.S. Cl. ................................................... 345/619
(58) Field of Search .................................. 345/543, 619

(56) References Cited

U.S. PATENT DOCUMENTS 5,423,040 A * 6/1995 Epstein et al. .............. 718/102
6,266,053 B1 * 7/2001 French et al. ............ 715/500.1

OTHER PUBLICATIONS

Wavefront, "Using the Hypergraph", 1999.*
Pharr, M., Kolb, C., Gershbein, R., Hanrahan, P., "Rendering Complex Scenes with Memroy–Coherent Ray Tracing". 1997.*
Clay, S.R., "Optimization for Real–Time Graphics Applications"., Feb. 1996.*

* cited by examiner

Primary Examiner—Michael Razavi
Assistant Examiner—Hwa C. Lee
(74) Attorney, Agent, or Firm—Blakely, Sokoloff, Taylor & Zafman LLP (57) ABSTRACT

A system and method for optimizing the processing of a sequence of images represented as a directed acyclic graph. The method comprises receiving a selection of a view node at which point an output image is to be viewed. The cost to process each predecessor branch of nodes of a plurality of branches of nodes in the directed acyclic graph. The output image is rendered by processing the predecessor branches in order from most costly to least costly. In one embodiment, images may be represented as a directed acyclic graph. In one embodiment, the method also includes re-ordering the predecessor branches based on the cost to process the branches. The method may be implemented on a system such as a computer.

11 Claims, 4 Drawing Sheets

SYSTEM AND METHOD FOR OPTIMIZING THE PROCESSING OF IMAGES

FIELD OF THE INVENTION

The present invention relates to the field of computer graphics, compositing images, adding special effects to images, and the optimization of view images resulting therefrom.

BACKGROUND

Compositing images is the combining of more than one image to create a single new image. Compositing of images can be performed with a single image frame, such as a photograph or a sequence of images, such as film or movies. For example an image of a fish could be combined with the image of a grassy field so that the fish is swimming in the grass. Alternatively, two (or more) sequences of images can be composited. For example, a sequence of images of a wind blown grassy field and a sequence of images of a school of fish swimming through the ocean may be composited to form a sequence of images showing the school of fish swimming through the wind blown grassy field. The school of fish and/or the grassy field may be created in an animation program or be a film of real world events.

Compositing also includes the techniques of enhancing a sequence of images captured on film by adding special effects, computer generated images, still images, animation, and other filmed images to a motion picture. Compositing is used to alter a sequence of film, thus creating a new sequence of images. Special effects, computer generated images, still images, animation and other filmed images are combined with film by compositing to create a new, altered sequence of images.

To create an end result image or sequence of images, input images from various sources are combined with various effects. Effects may also be referred to as operators. Examples of effects include hue, color correction, zoom, composite, and others. These are examples of simple effects. Effects such as translate, rotate, scale, and shear are simple effects known as affine transforms. Affine transforms are transformations in which parallel lines remain parallel after the transformation. Complex effects include the application of computationally intensive algorithms to an image or sequence of images with Fourier transforms and other non-affine transforms.

SUMMARY

The invention provides a system and method for optimizing the processing of a sequence of images represented as a directed acyclic graph. The method comprises receiving a selection of a view node at which point an output image is to be viewed. The cost to process each predecessor branch of nodes of a plurality of branches of nodes in the directed acyclic graph. The output image is rendered by processing the predecessor branches in order from most costly to least costly. In one embodiment, images may be represented as a directed acyclic graph. In one embodiment, the method also includes re-ordering the predecessor branches based on the cost to process the branches. The method may be implemented on a system such as a computer.

BRIEF DESCRIPTION OF THE DRAWINGS

The features and advantages of the present invention will become apparent from the following detailed description of the present invention in which.

DETAILED DESCRIPTION

When creating a movie, sequences of images are traditionally shot with a camera, developed and edited to create a finished product. Special effects have been added to films in many ways. More recently, with the availability of high powered computers, computer software programs are increasingly used to assist in the creation of movies, television shows, and other video presentations whether originating from animation or live action camera shots. To clarify various qualities of the present invention, the phrase video presentation includes sequences of images such as film, movies, animation, features, shorts, and the like created by digital film or video footage, digitized film or video input, computer generated images, hand drawn images, still images such as photographs and the compositing of each of these including the adding of effects. In addition, the phrase sequence of images includes any sequence of images created by filming, videotaping, still photography, computer generated images such as animation, hand drawn images such as animation, and the like.

In one embodiment, the image data that is used to represent the video presentations and sequences of images may include two-dimensional and three-dimensional geometry data such as mesh, bicubic patches, particle effect data, and any other method that defines a set of points and a rotation of how the points are joined or assembled to form a surface. This geometry data may include representations of basic geometric shapes such as spheres, rectangles, pyramids, cones, etc. The image data may also include color data and texture data for each point of geometry data. Further, in one embodiment, a video presentation or sequence of images may be accompanied by audio data including a soundtrack comprising sound effects, voice, music, etc. The audio data may include sound data or music data comprising a soundtrack and may be in any format such as, for example, the audio interchange file format (AIFF) and wave format (WAV). In this embodiment, effects that apply to audio data may be added to the palette of video effects. Such audio effects may include, for example, volume, left to right, right to left, center, equalize, dampen, fade in, fade out, etc. In addition, in some embodiments, the video effects may also include audio related properties.

Computer programs used in manipulating sequences of images for producing video presentations are compositing programs commonly referred to as effects software or digital effects software. Examples of such programs include Media Illusion® available from the Softimage™ division of Avid Technology, Inc., One Park West, Tewksbury, Mass. 01876; Chalice, available from Silicon Grail Corporation, 710 Seward Street, Hollywood, Calif. 90038, and the Maya and Studio series of programs, available from Alias|Wavefront®, 210 King Street East, Toronto, Ontario, Canada M5A 1J7.

When using a compositing program, sequences of images stored in a variety of formats are input. Common formats of digital images used in producing video presentations include Alias|Wavefront's RLA format (more information is available from Alias|Wavefront®, 210 King Street East, Toronto, Ontario, Canada M5A 1J7), Silicon Graphic's SGI format (more information is available from Silicon Graphics, Inc., 1600 Amphitheatre Parkway, Mountain View, Calif. 94043), and Kodak's Cineon digital film format (more information is available from Eastman Kodak Company, Rochester, N.Y.).

Figure 1:
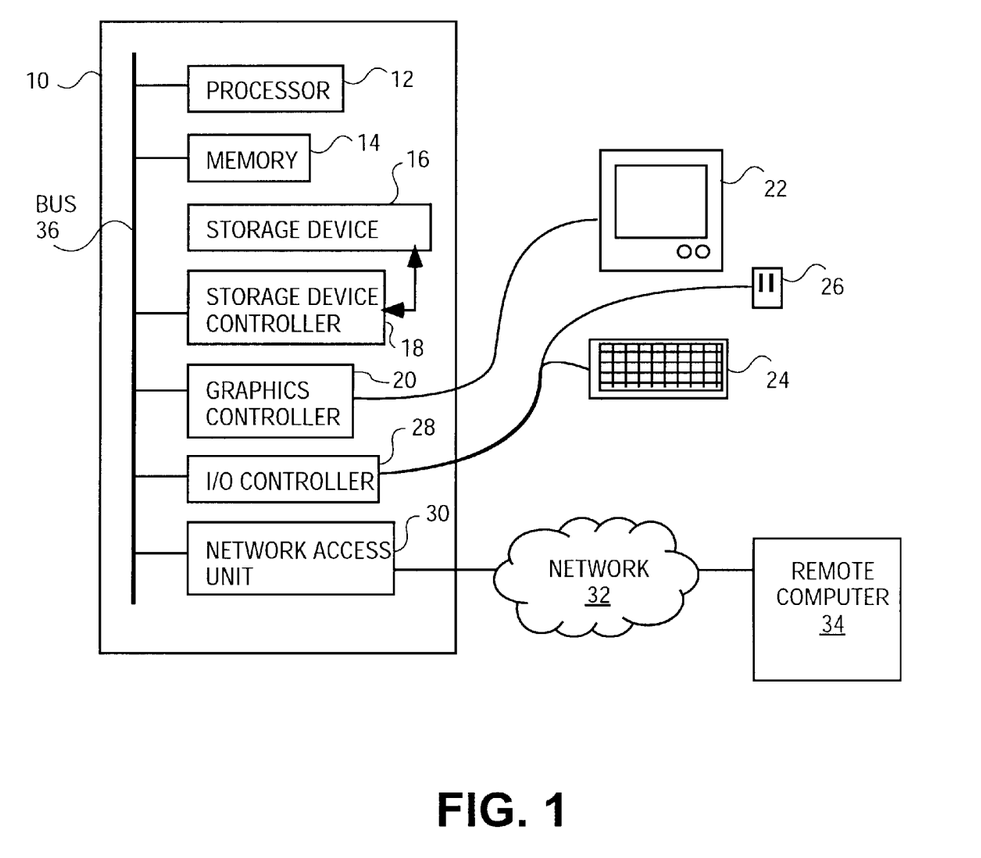
FIG. 1 depicts one embodiment of a system and environment in which the method disclosed herein is executed.

FIG. 1 depicts one embodiment of a system and environment in which the method disclosed herein is executed. A compositing program is executed on a computing device such as computer 10. The computer comprises a processor 12 to execute the compositing program. Processor 12 may be any computer processor known to those skilled in the art. When executing the compositing program, the processor utilizes memory 14. Memory 14 may be any form of volatile random access memory (RAM) known to those skilled in the art. The compositing program accesses sequences of images from storage device 16 via storage device controller 18. Storage device 16 may be a readable and writeable disk drive such as, for example, a hard disk, a floppy disk, a tape device such as a digital audio tape (DAT) reader/writer and other magnetic media; a readable and writeable compact disk (CDRW), and other optical media; a Memory Stick® storage device or other stick and card memory devices. That is, storage device 16 may be any device for reading a machine readable medium locally or remotely accessible in or by the computer, such as those previously described.

When the compositing program reads an image or sequence of images from the storage device, the processor may communicate instructions to graphics controller 20 to display the images on display device 22. Graphics controller 20 may be any graphics controller known to those skilled in the art, and display device 22 may be any display monitor known to those skilled in the art, including, but not limited to, a cathode ray tube (CRT) display monitor and thin film transistor (TFT) display screen. A user accesses the compositing program running on computer 10 via any computer input device known to those skilled in the art, such as, for example, keyboard 24 and mouse 26 which are coupled to the processor by input/output (I/O) controller 28.

In one embodiment, to access images not stored on computer 10, computer 10 includes a network access unit 30 which allows the compositing program to communicate over network 32 to remote computer 34 and access images stored on remote computer 34. Network 32 may be a local area network (LAN), wide area network (WAN), or any other kind of network known to those skilled in the art. Remote computer 34 may be any kind of computer known to those skilled in the art, including, but not limited to, personal computers, specialty graphics workstations, and servers. Remote computer 34 may include at least one storage device (not shown) such as, for example, a hard disk drive, a readable compact disk (CDR), a disk array, or other machine readable medium. Although only one remote computer and one network are depicted, multiple remote computers over multiple networks may be connected to computer 10. Processor 12, memory 14, storage device controller 18, graphics controller 20, I/O controller 28 and network access unit 30, are coupled to one another via and communicate with one another over bus 36. Bus 36 may be any bus known to those skilled in the art. Although only one bus is depicted, multiple buses may be used in computer 10. In addition, other internal components known to those skilled in the art (not depicted) or multiple instances of depicted components may be included in computer 10.

Figure 2A:
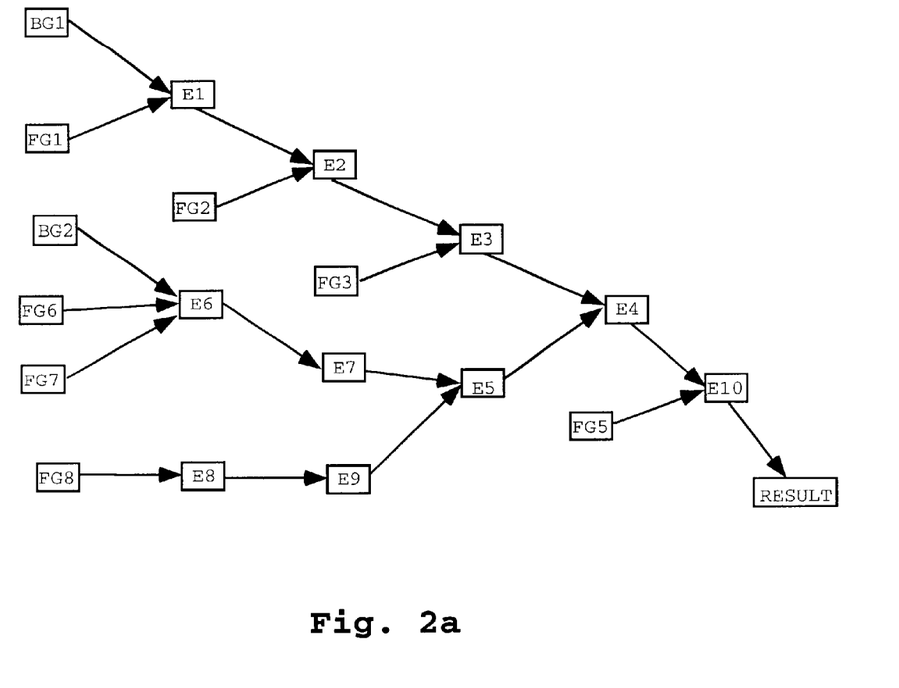
FIG. 2a depicts an example compositing tree comprised of effects and images.

FIG. 2a depicts an example compositing tree comprised of effects and images. A compositing tree is a directed acyclic graph that results when a user of a compositing program selects images and effects to create a final resulting image. When using compositing programs, a user manually designates images, sequences of images, and effects that will be combined to form a resulting sequence of images. The compositing tree reflects the selections made by the user and may be depicted in various ways. Each rectangle in FIG. 2a is a node. Each node represents an effect. Even though effects are more commonly thought of as operations that alter an image, obtaining an image or sequence of images from a local or remote disk (or other media) may be considered a node with no input, or an effect with no input.

Typically, to begin the process of creating a composited sequence of images, the user designates an image such as background image BG1. The user may then choose an effect such as effect E1 to apply to background image BG1. Both foreground image FG1 and background image BG1 are inputs to effect E1. Such an arrangement would typically result from E1 being a simple composite effect such that foreground image FG1 and background image BG1 are combined. The user may then combine the composite of BG1 and FG1 with another foreground image FG2 via effect E2, another simple composite operator.

Using the example discussed above in the background section, BG1 may be the grassy field, and FG1 and FG2 may be different images of fish. In this example, FIG. 2a could be though of as combining multiple fish. As such, foreground images FG1, FG2, FG3 and FG5 are combined via effects E2, E3 and E10, simple composite operators, to create four fish in grass, the RESULT. FG1, FG2, FG3 and FG5 may be four different fish, or may be the same image, or may be four different sequences of images. In addition, each of FG1, FG2, FG3 and FG5 may be filmed images, photographed images, computer generated images, animation, or any other kind of image or sequence of images.

In addition, the compositing tree may also include a larger branch such as that shown connecting to effect E5. To add a human diver in front of a submarine to the fish swimming in the grassy field, background image BG2 could be the submarine, foreground image FG6 could be a graphical image depicting the name and allegiance of the submarine, and foreground image FG7 could be the human diver. Images BG2, FG6 and FG7 may be combined by composite effect E6. Further, effect E7 may be applied to the diver in front of the labeled submarine. Effect E7 could be any effect available via the compositing system, such as a hue adjustment or a framing adjustment. A graphic artist may use effect E7 for any number of purposes, such as to melt or soften the edges of the diver and the submarine so that they blends better into the remainder of the image. Another diver could be added by foreground image FG8, and FG8 may have color correction effect E8 and another effect E9, such as hue adjustment, applied before being combined with the diver in front of the submarine by simple composite effect E5. The RESULT of this example would be four fish, a labeled submarine and two divers in a grassy field.

Although not used in this example, any of the images may be geometry data defining a two-dimensional or a three-dimensional shape. If geometry data is used, the effects must be of the kind that accept geometry data. In addition, although not used in this example, any of the images may be replaced by or augmented by audio data so that a sound track and/or sound effects may be added to the video presentation. The use of audio data implies that the effects are capable of processing audio data, including sound data and/or music data.

When working with a compositing tree such as that in FIG. 2a the user of the compositing system regularly checks on the state of the images at certain points in the compositing sequence. For example, the user may wish to view the current image that results from effect E2. To achieve this, the user may select E2, and then issue a command to view the current image. This request may be made according to any method known to those skilled in the art, and may vary among various software packages. To process the current image, the compositing program must evaluate all of the nodes and execute all of the effects in the branches before the node that is the selected current image. Images processing such as this requires a significant amount of memory. The memory needed typically exceeds available RAM, and as such, disk swapping must be utilized, resulting in transferring image data between RAM and disk.

Figure 2B:
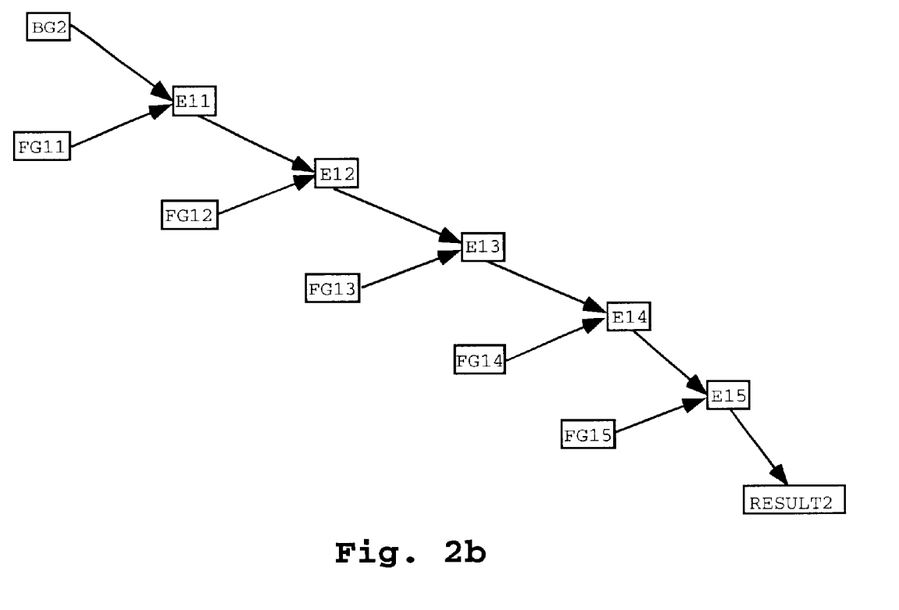
FIG. 2b depicts an example compositing tree comprised of images and effects, where all the effects are simple composites.

FIG. 2b depicts an example compositing tree comprised of images and effects, where all the effects are simple composites. That is, FIG. 2b depicts a sequential series of composites. Background image BG2 is composited with foreground image FG11 via effect E11, a simple composite. The image resulting from E11 is then combined with FG12 via simple composite effect E12, and so on until the image RESULT2 is produced. The image RESULT2 is a composite of images FG11, FG12, FG13, FG14 and BG2. This compositing tree is of the form known as herring bone or reverse herring bone, where image after image is composited with the result of the prior composite.

Some traditional compositing systems use a first-in-first-out memory caching system such that as the memory system reaches capacity, the oldest memory segment is flushed so that the newest image information may be stored in the reclaimed memory segment. In traditional systems, when a simple composite is applied to an image, the two input images are retrieved from the disk and stored in two memory cache segments, the composite is implemented, and the result is stored in a newly allocated third memory cache segment. As such, three memory cache segments are allocated and used.

To view a current image such as the image at the node labeled RESULT2 of FIG. 2b, a traditional composite program proceeds backward from the selected node in a fixed, defined manner. In a first traditional method, the method may look for predecessor nodes with only children as input nodes, and process that node first. Such a method results in the method obtaining images and applying effects in sequence from the first image to the current image when implemented on a herring bone. This method is well suited to a herring bone compositing tree. For example, referring to the compositing tree in FIG. 2b, images BG2 and FG11 would be cached. A third cache segment would then be allocated, and the resulting image of effect E11, the composite of BG2 and FG11, would be stored in the third cache segment. Image FG12 would then be read and cached in a fourth cache segment, effect E12 would be applied such that the composite of the image in the third cache segment and the fourth cache segment would be placed in a fifth cache segment. This would continue similarly through image FG13 and effect E15 to produce the RESULT image. If the memory of the computer system is only large enough to hold image data for four images in memory, the older, BG2, FG11, etc. would successively be purged from the memory, freeing up needed cache space for the image resulting from E12, retrieving image FG13, etc.

Another similar traditional method is to evaluate all images from closest to furthest. With this second traditional method, the input images to E15 would first be evaluated, causing FG15 to be cached and the requiring the input of E14 to be cached. This would cause FG14 to be cached. Then the inputs to E13, E12, and E11 would be cached. Depending on the amount of memory available, FG15 and earlier cached images may be flushed to make room for the later cached images only to be flushed and re-cached. This approach is very inefficient as many images that are not used are cached, only to be re-cached again when actually needed. Another variation of this traditional method is to only cache an image when all inputs to an effect are available. This would result in the first traditional method, farthest to closest being evaluated.

Because of the simple, direct flow of the herring bone compositing tree, the first traditional method is relatively effective and efficient when applying effects. This first traditional method, although efficient for herring bone type compositing trees, is not very efficient for more complex and, now, common compositing effects trees. Using the traditional method with modern compositing effects trees results in delays when a user requests a current image.

Figure 2C:
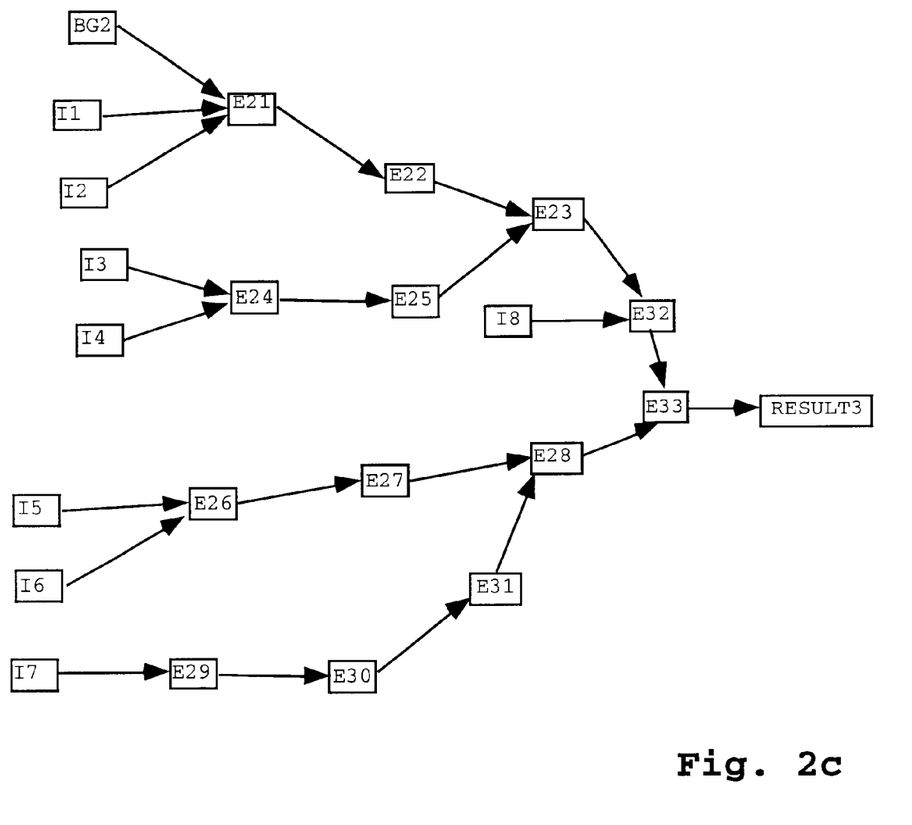
FIG. 2c depicts an example of a more complex compositing tree comprised of effects and images.

FIG. 2c depicts an example of a more complex compositing tree comprised of effects and images. Although the traditional method works well with herring bone compositing trees such as FIG. 2b, this traditional method results in slow processing of effects due to memory management overhead and unneeded, extra swapping of image data into and out of memory when processing more complicated compositing trees. A traditional compositing program processes images and effects in a predefined manner, without regard for the particular composite tree, and, as such, is inefficient in using memory when processing composite trees such as in FIGS. 2a and 2c. As compositing trees have become increasingly complex, the traditional processing method has shown itself to be slow and inefficient.

The goal of the optimized method disclosed herein is to minimize the maximum number of memory caches required to evaluate an image selected to be viewed. According to the optimized method disclosed herein, only when an effect has more than one input or when an effect is complex, is allocation of additional memory cache needed.

In traditional systems, when an effect is applied to a node, the image at the node is retrieved from a memory cache segment, the effect is implemented on the image, and the result is stored in a newly allocated memory cache segment. As such, two memory cache segments are allocated and used. For a simple composite, three memory cache segments may be used, as discussed above.

Applying the traditional method to a complex compositing tree such as that shown in FIG. 2c is inefficient and slow. For example, using one traditional FIFO caching and tree traversal method to view the image at node E23, images BG2, I1 and I2 would each be cached in their own memory segments, composite effect E21 would be applied and the result stored in a fourth memory segment. Effect E22 would be applied, and the result stored in a fifth memory segment. However, if the system only has enough memory to store four sets of image data in memory, the first memory segment holding the oldest image data, BG2, would be flushed and reused as the fifth segment. The other input to E23 is then processed. I3 and I4 are each loaded into memory. Doing so displaces I1 and I2, the oldest caches/memory segments. Simple composite E24 is applied and a new cache segment is needed such that the result of E21 is flushed to make room for the result of E24. Effect E25 is then applied to the result of E24 and placed in a newly allocated cache segment. To obtain this cache segment, the result of E22 would be flushed and swapped to disk for later use. However, the later use is actually immediate, as E23 takes the result of E22 and E25 as input. Although I3 and I4 are unneeded, they remain cached, whereas the result of E22, which is needed, has been cleared form the cache and swapped to disk. This is one example of the inefficiency of the traditional method when applied to a not very complicated compositing tree that is more complex than a simple herring bone compositing tree. In reality, the size of compositing trees and the number of images that can be stored are much larger, but, nonetheless, the same result occurs.

Figure 3:
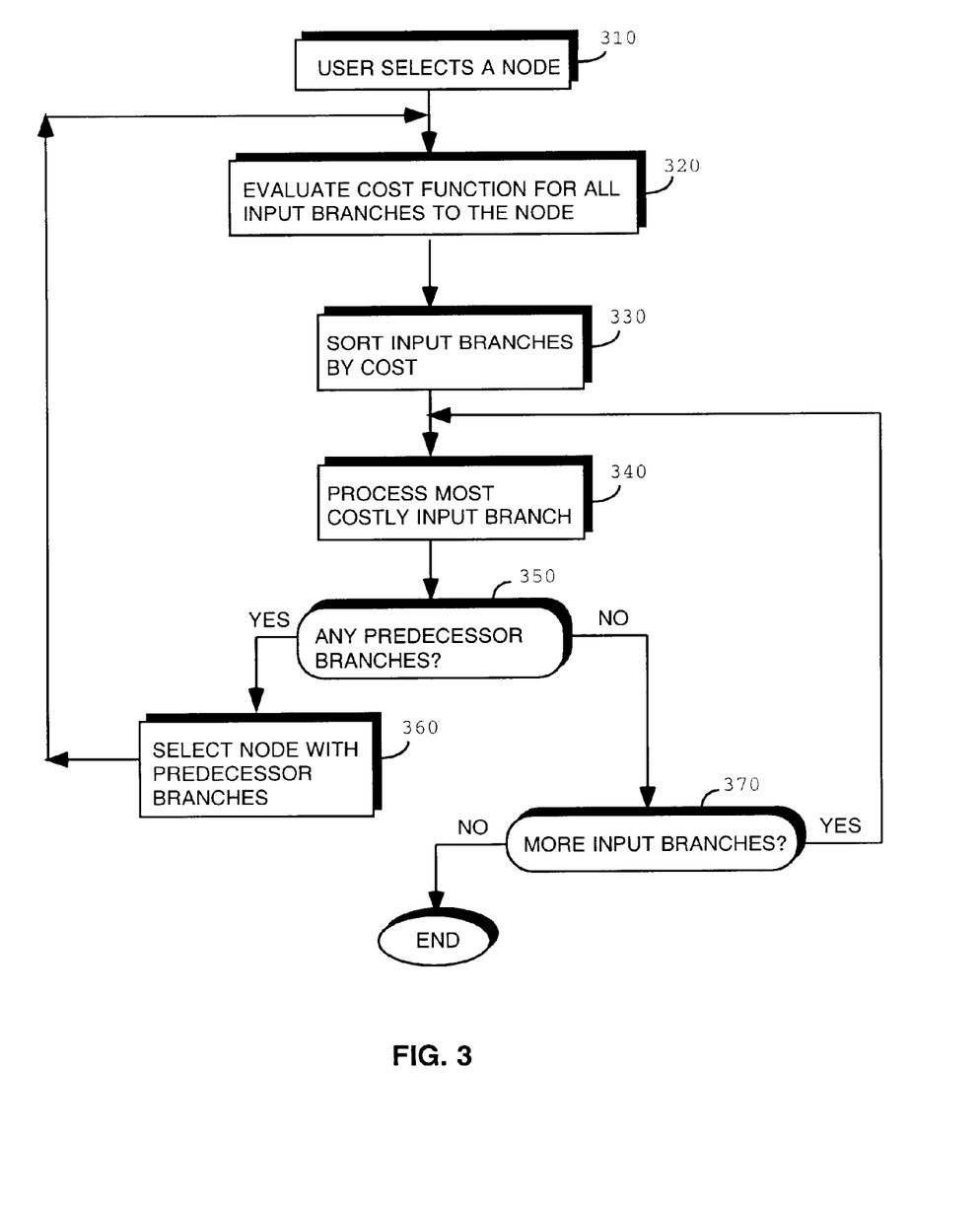
FIG. 3 depicts the flow of an embodiment of the method for optimizing the processing of images represented as directed acyclic graphs.

FIG. 3 depicts the flow of an embodiment of the method for optimizing the processing of images represented as directed acyclic graphs. The optimization method disclosed herein uses a technique known as "rendering in place" in conjunction with processing the most costly branch first to increase image processing performance when viewing a current image of a composite tree.

In one embodiment, render in place is a technique that allows an effect to be implemented on a currently cached image so that no additional cache segments are necessary. This reduces the amount of memory needed to process and view an image at a particular node. Render in place also reduces memory management overhead as less memory management is needed, resulting in increased performance as less disk swapping is needed. Render in place is used when any simple effects such as hue, color correct, simple composite, RGB extract, RGB graph, etc., are to be implemented on an image. However, complex effects such as warping, scaling, Fourier transforms and other non-affine transforms require too much memory and/or manipulation of data to be rendered in place, and additional cache segment(s) may be needed. Using render in place in conjunction with processing the most costly branch first increases the speed at which a current image is produced responsive to a user request.

Rendering in place reduces memory usage in the following way. Referring to FIG. 2c, to display an image at node E25, image I3 is retrieved and placed into memory. Because E24 is a simple composite, the simple composite renders the composite of I4 and I3 into the memory location where I3 is cached. Rendering in place may be viewed as an effect having the same input memory location and output memory location. That is, for example, when I3 is cached in memory, simple composite E24 reads I4 from the disk drive, caches I4 and performs the composite directly on the I3 image in the memory location in which I3 is stored. This simple composite requires two memory segments rather than three according to a traditional method (as described above).

In one embodiment, the optimized method disclosed herein may be implemented as a software component of a compositing system or effects software package. In addition, the method may be incorporated in hardware, other software, or a combination of hardware and software.

In one embodiment, the optimized method of the present invention includes the use of a cost function that determines the number of memory segments needed to evaluate a branch at a particular node. In this embodiment, the optimized method uses the cost function to minimize the maximum number of caches used in processing an image at a selected node. In another embodiment, the cost function may take into consideration one or more of the following: the complexity of the effect at the node; the complexity of the image data at the node; the processor load required to process the image at a node; the amount of memory in the system in comparison to the amount of memory required to process the node; and/or the quality of the image to be rendered, as determined by the user or defined by the system.

In some embodiments, the cost may be determined recursively or iteratively. In such an embodiment, a refining of the cost by recursive or other iterative application of the cost function may also take into consideration the same factors, as well as whether speed of rendering can be enhanced by and/or memory usage reduced by temporarily reducing the resolution of the image to be rendered. In various embodiments, temporary image reduction may be achieved in various ways, such as, for example: by temporarily decreasing the color depth by, for example, from 16 bits to 8 bits; by temporarily scaling the image size, for example in half or one quarter; when audio data is present with the image data, temporarily reducing the sample rate of the audio data; and when geometry data is present, reducing the points in the mesh. In these embodiments, the temporary reduction may be reversed when a final image or sequence of images is to be rendered. In these embodiments, only when the temporary reduction in resolution will not impair the quality of the image below a system or user specified quality threshold will the temporary reduction be applied. By applying the temporary reduction, the cost of processing an image at a view node is reduced as less processing power and less memory is required to render the selected node.

Referring now to FIG. 3, after a user selects a node at which the user wishes to view an image, as shown in block 310, a cost function like those described above is called to evaluate how costly it is to process the image at all input branches to the selected node, as shown in block 320. The input branches are sorted by cost, as shown in block 330. The most costly input branch is then processed, as shown in block 340. A check is then made to determine whether the current branch is comprised of predecessor branches, as shown in block 350. If there are predecessor branches, the node with predecessor branches is selected, as shown in block 360, and the method continues at block 320 as discussed above. If there are no sub-branches, as shown in block 350, a check is made to determine whether there are more input branches to the current node, as shown in block 370. If there are, the most costly input branch is then processed as shown in block 340. If there are no more input branches to the selected node, the method ends, as shown in block 380. In one embodiment, the optimized method may be implemented recursively.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

APPENDIX A

William E. Alford, Reg. No. 37,764; Farzad E. Amini, Reg. No. P42,261; Aloysius T. C. AuYeung, Reg. No. 35,432; William Thomas Babbitt, Reg. No. 39,591; Carol F. Barry, Reg. No. 41,600; Jordan Michael Becker, Reg. No. 39,602; Bradley J. Bereznak, Reg. No. 33,474; Michael A. Bernadicou, Reg. No. 35,934; Roger W. Blakely, Jr., Reg. No. 25,831; Gregory D. Caldwell, Reg. No. 39,926; Ronald C. Card, Reg. No. 44,587; Andrew C. Chen, Reg. No. 43,544; Thomas M. Coester, Reg. No. 39,637; Alin Corie, Reg. No. P46,244; Dennis M. deGuzman, Reg. No. 41,702; Stephen M. De Klerk, under 37 C.F.R. § 10.9(b); Michael Anthony DeSanctis, Reg. No. 39,957; Daniel M. De Vos, Reg. No. 37,813; Robert Andrew Diehl, Reg. No. 40,992; Sanjeet Dutta, Reg. No. P46,145; Matthew C. Fagan, Reg. No. 37,542; Tarek N. Fahmi, Reg. No. 41,402; Paramita Ghosh, Reg. No. 42,806; James Y. Go, Reg. No. 40,621; James A. Henry, Reg. No. 41,064; Willmore F. Holbrow III, Reg. No. P41,845; Sheryl Sue Holloway, Reg. No. 37,850; George W Hoover II, Reg. No. 32,992; Eric S. Hyman, Reg. No. 30,139; William W. Kidd, Reg. No. 31,772; Sang Hui Kim, Reg. No. 40,450; Eric T. King, Reg. No. 44,188; Erica W. Kuo, Reg. No. 42,775; Kurt P. Leyendecker, Reg. No. 42,799; Michael J. Mallie, Reg. No. 36,591; Andre L. Marais, under 37 C.F.R. § 10.9(b); Paul A. Mendonsa, Reg. No. 42,879; Darren J. Milliken, Reg. 42,004; Lisa A. Norris, Reg. No. 44,976; Chun M. Ng, Reg. No. 36,878; Thien T. Nguyen, Reg. No. 43,835; Thinh V. Nguyen, Reg. No. 42,034; Dennis A. Nicholls, Reg. No. 42,036; Daniel E. Ovanezian, Reg. No. 41,236; Marina Portnova, Reg. No. P45,750; Babak Redjaian, Reg. No. 42,096; William F. Ryann, Reg. 44,313; James H. Salter, Reg. No. 35,668; William W. Schaal, Reg. No. 39,018; James C. Scheller, Reg. No. 31,195; Jeffrey Sam Smith, Reg. No. 39,377; Maria McCormack Sobrino, Reg. No. 31,639; Stanley W. Sokoloff, Reg. No. 25,128; Judith A. Szepesi, Reg. No. 39,393; Edwin H. Taylor, Reg. No. 25,129; John F. Travis, Reg. No. 43,203; George G. C. Tseng, Reg. No. 41,355; Joseph A. Twarowski, Reg. No. 42,191; Lester J. Vincent, Reg. No. 31,460; Glenn E. Von Tersch, Reg. No. 41,364; John Patrick Ward, Reg. No. 40,216; Mark L. Watson, Reg. No. P46,322; Thomas C. Webster, Reg. No. P46,154; Charles T. J. Weigell, Reg. No. 43,398; Kirk D. Williams, Reg. No. 42,229; James M. Wu, Reg. No. 45,241; Steven D. Yates, Reg. No. 42,242; and Norman Zafman, Reg. No. 26,250; my patent attorneys, and Justin M. Dillon, Reg. No. 42,486; my patent agent, of BLAKELY, SOKOLOFF, TAYLOR & ZAFMAN LLP, with offices located at 12400 Wilshire Boulevard, 7th Floor, Los Angeles, California 90025, telephone (310) 207-3800, and James R. Thein, Reg. No. 31,710, my patent attorney.

APPENDIX B

Title 37, Code of Federal Regulations, Section 1.56
Duty to Disclose Information Material to Patentability (a) A patent by its very nature is affected with a public interest. The public interest is best served, and the most effective patent examination occurs when, at the time an application is being examined, the Office is aware of and evaluates the teachings of all information material to patentability. Each individual associated with the filing and prosecution of a patent application has a duty of candor and good faith in dealing with the Office, which includes a duty to disclose to the Office all information known to that individual to be material to patentability as defined in this section. The duty to disclosure information exists with respect to each pending claim until the claim is cancelled or withdrawn from consideration, or the application becomes abandoned. Information material to the patentability of a claim that is cancelled or withdrawn from consideration need not be submitted if the information is not material to the patentability of any claim remaining under consideration in the application. There is no duty to submit information which is not material to the patentability of any existing claim. The duty to disclosure all information known to be material to patentability is deemed to be satisfied if all information known to be material to patentability of any claim issued in a patent was cited by the Office or submitted to the Office in the manner prescribed by §§1.97(b)-(d) and 1.98. However, no patent will be granted on an application in connection with which fraud on the Office was practiced or attempted or the duty of disclosure was violated through bad faith or intentional misconduct. The Office encourages applicants to carefully examine:

(1) Prior art cited in search reports of a foreign patent office in a counterpart application, and (2) The closest information over which individuals associated with the filing or prosecution of a patent application believe any pending claim patentably defines, to make sure that any material information contained therein is disclosed to the Office.

(b) Under this section, information is material to patentability when it is not cumulative to information already of record or being made or record in the application, and (1) It establishes, by itself or in combination with other information, a prima facie case of unpatentability of a claim; or (2) It refutes, or is inconsistent with, a position the applicant takes in:

(i) Opposing an argument of unpatentability relied on by the Office, or (ii) Asserting an argument of patentability.

A prima facie case of unpatentability is established when the information compels a conclusion that a claim is unpatentable under the preponderance of evidence, burden-of-proof standard, giving each term in the claim its broadest reasonable construction consistent with the specification, and before any consideration is given to evidence which may be submitted in an attempt to establish a contrary conclusion of patentability.

(c) Individuals associated with the filing or prosecution of a patent application within the meaning of this section are:

(1) Each inventor named in the application;

(2) Each attorney or agent who prepares or prosecutes the application; and (3) Every other person who is substantively involved in the preparation or prosecution of the application and who is associated with the inventor, with the assignee or with anyone to whom there is an obligation to assign the application.

(d) Individuals other than the attorney, agent or inventor may comply with this section by disclosing information to the attorney, agent, or inventor.

Rev. 02/07/00 (D2)

What is claimed is:

1. A method for optimizing the performance in processing a sequence of images represented as a directed acyclic graph comprising:
receiving a selection of a view node from a plurality of nodes of the directed acyclic graph, at which point an output image is to be viewed;
evaluating the cost to process each predecessor branch of nodes of a plurality of branches of nodes in the directed acyclic graph;
rendering the output image by processing the predecessor branches in order from most costly to least costly; and
re-ordering the predecessor branches based on the cost to process the branches, comprises:
processing each node in each predecessor branch from the closest to the view node to the furthest from the view node,
determining whether a current node may be rendered in places, and
re-ordering the current node, if the current node allows for rendering in place.

2. The method of claim 1 wherein the sequence of images comprises:
audio data; and
image data.

3. The method of claim 2 wherein the image data comprises:
geometry data.

4. The method of claim 1 wherein evaluating the cost comprises:
calculating the amount of memory needed to process the predecessor branch.

5. The method of claim 1 wherein determining comprises:
evaluating whether the current node is a simple effect; and
concluding that the node may be rendered in place if the node is a simple effect.

6. A machine readable medium having stored thereon instructions which when executed by a processor cause the machine to perform operations comprising:
receiving a selection of a view node from a sequence of images represented as a directed acyclic graph comprised of a plurality of nodes, at which point an output image is to be viewed;
evaluating the cost to process each predecessor branch of nodes of a plurality of branches of nodes in the directed acyclic graph;
rendering the output image by processing the predecessor branches in order from most costly to least costly; and
re-ordering the predecessor branches based on the cost to process the branches, comprises:
processing each node in each predecessor branch from the closest to the view node to the furthest from the view node,
determining whether a current node may be rendered in places, and
re-ordering the current node, if the current node allows for rendering in place.

7. The machine readable medium of claim 6 wherein the instructions cause the machine to perform further operations comprising:
calculating the amount of memory needed to process the predecessor branch.

8. The machine readable medium of claim 6 wherein determining comprises:
evaluating whether the current node is a simple effect; and
concluding that the node may be rendered in place if the node is a simple effect.

9. A system for optimizing the performance in processing a sequence of images represented as a directed acyclic graph comprising:
means for receiving a selection of a view node from the directed acyclic graph at which point an output image is to be viewed;
means for evaluating the cost to process each predecessor branch of nodes of a plurality of branches of nodes in the directed acyclic graph;
means for rendering the output image by processing the predecessor branches in order from most costly to least costly; and
means for re-ordering the predecessor branches based on the cost to process the branches, the means for re-ordering comprises:
means for processing each node in each predecessor branch from the closest to the view node to the furthest from the view node,
means for determining whether a current node may be rendered in place, and
means for re-ordering the current node when the current node allows for rendering in place.

10. The system of claim 9 wherein the means for evaluating comprises:
means for calculating the amount of memory needed to process the predecessor branch.

11. The system of claim 9 wherein the means for determining comprises:
means for evaluating whether the current node is a simple effect; and
means for concluding that the node may be rendered in place if the node is a simple effect.

* * * * *